(12) United States Patent
Hemphill et al.

(10) Patent No.: US 11,038,376 B2
(45) Date of Patent: Jun. 15, 2021

(54) WIRELESS POWER TRANSMITTER, WIRELESS POWER TRANSMISSION SYSTEM AND METHOD FOR DRIVING A WIRELESS POWER TRANSMISSION SYSTEM

(71) Applicant: TDK Electronics AG, München (DE)

(72) Inventors: Hugh Hemphill, Solothurn (CH); Thomas Lohmann, Solothurn (CH)

(73) Assignee: TDK ELECTRONICS AG, Munich (DE)

( * ) Notice: Subject to any disclaimer, the term of this patent is extended or adjusted under 35 U.S.C. 154(b) by 41 days.

(21) Appl. No.: 16/333,977

(22) PCT Filed: Sep. 16, 2016

(86) PCT No.: PCT/EP2016/071975
§ 371 (c)(1),
(2) Date: Mar. 15, 2019

(87) PCT Pub. No.: WO2018/050239
PCT Pub. Date: Mar. 22, 2018

(65) Prior Publication Data
US 2019/0252923 A1    Aug. 15, 2019

(51) Int. Cl.
*H02J 50/12*    (2016.01)
*H02J 50/70*    (2016.01)
(Continued)

(52) U.S. Cl.
CPC .............. *H02J 50/12* (2016.02); *H01F 27/28* (2013.01); *H01F 38/14* (2013.01); *H02J 5/005* (2013.01);
(Continued)

(58) Field of Classification Search
CPC ........ H04B 5/0037; H02J 50/40; H02J 50/12; H02J 5/005; H02J 50/70; H01F 38/14; H01F 27/28
See application file for complete search history.

(56) References Cited

U.S. PATENT DOCUMENTS

2009/0072628 A1    3/2009    Cook et al.
2009/0230777 A1*   9/2009    Baarman ................. H01F 38/14
                                                                 307/104
(Continued)

FOREIGN PATENT DOCUMENTS

EP    2927915 A2    10/2015
JP    H07320201 A   12/1995
(Continued)

*Primary Examiner* — Jared Fureman
*Assistant Examiner* — Esayas G Yeshaw
(74) *Attorney, Agent, or Firm* — Slater Matsil, LLP

(57) ABSTRACT

A wireless power transmitter, a wireless power transmitter and a method for driving a wireless power transmission system are disclosed. In an embodiment, a wireless power transmitter includes an inverter, an impedance circuit, an inductance circuit with a first transmission coil and a second transmission coil and a switch circuit. The impedance circuit and the inductance circuit establish a resonance circuit. The inverter is configured to provide AC power to the resonance circuit. The switch circuit is configured to couple the first transmission coil directly and/or via the second transmission coil to the impedance circuit to change a resonance frequency of the resonance circuit and to keep a frequency of the AC power within a prescribed range.

19 Claims, 7 Drawing Sheets

US 11,038,376 B2
Page 2

(51) Int. Cl.
  *H01F 27/28* (2006.01)
  *H01F 38/14* (2006.01)
  *H02J 5/00* (2016.01)
  *H04B 5/00* (2006.01)
  *H02J 50/40* (2016.01)

(52) U.S. Cl.
  CPC ............ *H02J 50/70* (2016.02); *H04B 5/0037* (2013.01); *H02J 50/40* (2016.02)

(56) References Cited

U.S. PATENT DOCUMENTS

| | | | |
|---|---|---|---|
| 2010/0172371 A1 | 7/2010 | Huang et al. | |
| 2011/0009057 A1 | 1/2011 | Saunamaki | |
| 2011/0074304 A1* | 3/2011 | Honsberg-Riedl | H05B 45/37 315/250 |
| 2012/0025623 A1 | 2/2012 | Low et al. | |
| 2012/0248892 A1 | 10/2012 | Covic et al. | |
| 2013/0024059 A1* | 1/2013 | Miller | B60L 11/182 701/22 |
| 2013/0076153 A1 | 3/2013 | Murayama et al. | |
| 2013/0285467 A1 | 10/2013 | Takahashi | |
| 2014/0145807 A1 | 5/2014 | Choi et al. | |
| 2015/0145634 A1 | 5/2015 | Kurz et al. | |
| 2015/0224883 A1* | 8/2015 | Ichikawa | B60L 50/16 320/108 |
| 2015/0349541 A1 | 12/2015 | Yamamoto et al. | |
| 2015/0357113 A1* | 12/2015 | Scholz | H01F 5/00 336/200 |
| 2015/0371771 A1 | 12/2015 | Qahouq | |
| 2016/0064994 A1 | 3/2016 | Ku et al. | |
| 2016/0072336 A1* | 3/2016 | Tamino | H02J 50/05 320/108 |
| 2016/0134131 A1 | 5/2016 | Murayama | |
| 2016/0172867 A1* | 6/2016 | Arendarik | H02J 50/10 307/104 |
| 2016/0257209 A1 | 9/2016 | Lewis | |
| 2017/0018969 A1* | 1/2017 | Zhang | H02J 7/025 |
| 2017/0222466 A1 | 8/2017 | Sankar | |
| 2017/0331173 A1* | 11/2017 | Ju | H01Q 7/06 |
| 2019/0176299 A1 | 6/2019 | Chan | |

FOREIGN PATENT DOCUMENTS

| | | |
|---|---|---|
| JP | 2001238372 A | 8/2001 |
| JP | 2006042519 A | 2/2006 |
| JP | 2012130173 A | 7/2012 |
| JP | 2013502193 A | 1/2013 |
| JP | 2014155307 A | 8/2014 |
| JP | 2019514712 A | 6/2019 |
| JP | 2019514715 A | 6/2019 |
| WO | 2009114671 A1 | 9/2009 |
| WO | 2015140917 A1 | 9/2015 |

* cited by examiner

WIRELESS POWER TRANSMITTER, WIRELESS POWER TRANSMISSION SYSTEM AND METHOD FOR DRIVING A WIRELESS POWER TRANSMISSION SYSTEM

This patent application is a national phase filing under section 371 of PCT/EP2016/071975, filed Sep. 16, 2016, which is incorporated herein by reference in its entirety.

TECHNICAL FIELD

The present invention refers to wireless power transmitters, e.g., transmitters that can be utilized in a wireless power transmission system, and two methods for driving a wireless power transmission system.

BACKGROUND

Wireless power transmitters and wireless power transmission systems can be utilized to transfer electric power toward a device without the need for physical connection. For example, handheld devices such as mobile communication devices or automobiles can be provided with electric power via such transmitters and transmission systems.

An intrinsic problem of wireless power transmission systems is that generally not reproducible arrangement of the power transmitter relative to the power receiver. For example, if a power transmitter is utilized to transmit electric power to an automobile having a power receiver then deviations in lateral and horizontal distances and in orientations are practically unavoidable. However, deviations in the distance between the transmitter and the receiver cause changes of the inductance of the transmission system leading to dissipative currents and a decreased efficiency.

From U.S. Patent Application Publication 2012/0025623 A1 inductive power receiver are known. From International Application Publication WO 2009/114671 A1 inductive power supply systems are known.

However, the need for power transmitters and for power transmission systems with reduced dissipative currents, and increased efficiency and an improved reliability but without the need for additional space and with an easily performable control system still exists. Further, the need for systems supporting interoperability, i.e., a cooperation of different power transmitters with different power receivers in a plurality of different environments and relative arrangements between transmitter and receiver exists.

SUMMARY OF THE INVENTION

Embodiments provide a wireless power transmitter comprising an inverter, an impedance circuit, an inductance circuit with a first transmission coil and a second transmission coil. Further, the wireless power transmitter comprises a switch circuit. The impedance circuit and the inductance circuit establish a resonance circuit. The inverter provides AC power to the resonance circuit. The switch circuit can couple the first transmission coil directly and/or via the second transmission coil to the impedance circuit to change a resonance frequency of the resonance circuit and to keep a frequency of the AC power within a prescribed range.

The inverter of the wireless power transmitter acts as the power source. The inverter receives electric power from an external circuit environment. The power received from the environment can be electric power provided with a conventional frequency of, e.g., 50 Hz or 60 Hz. Specifications that need to be fulfilled may be the limitation of the operation frequency of the inverter to a certain frequency range that may comprise frequencies between 81 and 90 kHz. The inverter can comprise an H-bridge for transforming electric power of low frequency, e.g., DC power, to electric power of the abovementioned frequency range. The H-bridge circuit for generating AC power is the element of which the operation frequency is changed to maintain a frequency within the above mentioned frequency range.

The inductance circuit can comprise further transmission coils. The transmission coils of the inductance circuit can be of different types. Each of the first and the second transmission coil and possibly further transmission coils can be a spiral-type coil or a double-D type coil (DD coil), for instance. A DD coil comprises two coil segments arranged one next to another. The two coil segments of a DD coil may be electrically connected in series and work together to give the coupling magnetic field a preferred shape with reduced field strength at unwanted positions.

Thus, it is possible that the transmission coils of the inductance circuit are selected from a DD coil and a spiral coil.

It was found that variations in distance between a wireless power transmitter and a wireless power receiver or variations in the orientation of power receiver relative to the wireless power transmitter not only lead to reduced power transfer efficiency but also to a change of resonance frequency of the resonance circuit. While a reduction in transmission efficiency is generally unwanted but acceptable, if the efficiency is not reduced too much, a frequency variation shifting the operation frequency of the inverter out of the above mentioned frequency range may not be acceptable. The abovementioned wireless power transmitter has the ability to keep the operation frequency within the above mentioned frequency range as the transmitter has at least two transmission coils and the ability to change the resonance frequency of the resonance circuit. The switch circuit can couple the first transmission coil to the impedance circuit resulting in a resonance circuit with the first resonance frequency. Further, the switch circuit can couple the second transmission coil between the first transmission coil and the impedance circuit in series to provide a resonance circuit with a second resonance frequency. The second resonance frequency can be different from the first resonance frequency. If it is found that the operation frequency of the inverter operating with the first transmission coil cannot keep the frequency within the allowed frequency range then in addition to the first transmission coil, the second transmission coil can be used to shift the operation frequency towards the allowed frequency range. In brief, the second transmission coil is an additional coil.

Thus, with the present wireless power transmitter a resonance circuit is provided that allows to change the resonance frequency in order to comply with frequency demands.

The switch circuit can provide a mode of operation where only the first transmission coil is electrically connected to the impedance circuit. Further, the switch circuit can provide an operation mode where both transmission coils are electrically connected to the impedance circuit. The wireless power transmitter can comprise further transmission coils, and for each transmission coil the switch circuit can provide a mode of operation where the respective transmission coil is exclusively connected to the impedance circuit to obtain a resonance circuit with optimal resonance frequency.

However, the switch circuit can be provided in such a way that it simultaneously connects two or more transmission coils to the impedance circuit. Then, the number of operation modes is vastly increased.

The impedance circuit comprises an impedance element that may be selected from one or more capacitive elements and/or from one or more inductive elements or from a network comprising capacitive and inductive circuit elements. The circuit elements of the impedance circuit can be chosen such that their impedance together with the active transmission coil of the inductive circuit establish a resonance circuit with an appropriate resonance frequency.

It is possible that the switch circuit can couple the first transmission coil parallel to or in series with a second transmission coil.

The vast number of different modes of operation when several transmission coils are present is further increased by the fact that a transmission coil or a group of transmission coils can be electrically connected in series to another transmission coil or to another group of transmission coils.

It is possible that the switch circuit can couple one transmission coil to the impedance circuit while the respective other transmission coil is separated from the impedance circuit. For example, if the first transmission coil is electrically connected to the impedance circuit, then the second transmission coil—and the respective other transmission coils if present—are decoupled from the impedance circuit.

Operation modes where only one transmission coil selected from the transmission coils of the inducting circuit is a part of a resonance circuit is preferred because electromagnetic interaction between different active transmission coils is reduced.

It is possible that the switch circuit comprises a first switch. Such a switch circuit can have the first switch electrically connected to a first electrode of the first transmission coil, to a first electrode of the second transmission coil and to one port of the impedance circuit. The first switch can selectively connect the first port of the impedance circuit either to the first electrode of the first transmission coil or to the first electrode of the second transmission coil. Of course, if the wireless power transmitter has more than two transmission coils, then the respective switch circuit can comprise multi-ports which is that selectively connect a respective port of the impedance circuit to a first or second electrode of the respective transmission coil.

The switch circuit can change a connection of the first transmission coil and the second transmission coil. When the switch circuit separates the first transmission coil from the second transmission coil, only the first transmission coil is connected to the impedance circuit. When the switch circuit connects the first transmission coil to the second transmission coil in series, the series circuit of the first transmission coil and the second transmission coil is connected to the impedance circuit.

Further, the switch circuit can comprise further switches to establish an electrical connection between different transmission coils to provide operation modes where more than two transmission coil is connected in series.

It is possible that the impedance circuit comprises a first capacitive element and a second capacitive element.

In particular, it is possible that the first capacitive element can be electrically connected between the first port of the impedance circuit and the inverter. The second capacitive element can be electrically connected between the second port of the impedance circuit and the inverter. Then, the wireless power transmitter can provide operation modes where either the first transmission coil or the series circuit, which comprises the first transmission coil and the second transmission coil connected to the first transmission coil in series, is electrically connected in series between the two capacitive elements.

If the wireless power transmitter comprises one main transmission coil (e.g., the first transmission coil) and more than one additional transmission coils, the main transmission coil or a combination, which comprises the main transmission coil and one or more additional coils connected to the main transmission coil in series, are electrically connected in series between the first capacitive element and the second capacitive element.

Accordingly, it is possible, that the wireless power transmitter has the switch circuit and a first and a second capacitor in the impedance circuit. The first transmission coil is connected in series between the first capacitive element and the second capacitive element. The switch circuit can electrically connect the second transmission coil in series between the first transmission coil and the second capacitive element.

As the transmission coils need to be aligned and arranged relative to the corresponding wireless power receiver, space for integrating the transmission coils is limited because all the transmission coils should be positioned at a similar position to act efficiently on the receiver. Thus, although a larger number of transmission coils allows a vast number of different operation modes, the number of transmission coils cannot be chosen arbitrarily. A detailed analysis of the inventor had the result that a wireless power transmitter comprising only two transmission coils already allows a limitation to a preferred frequency range in situations where sufficient large deviations of transmitter to receiver distances or alignment angles are present.

It is possible that the impedance circuit is electrically connected between the switch circuit and the inverter. The switch circuit is electrically connected between the inductance circuit and the impedance circuit.

Thus, the switch circuit and the impedance circuit are electrically connected between the inductance circuit comprising the transmission coils and the inverter. Via the switch circuit the elements of the impedance circuit and the elements (in particular, the transmission coils) of the inductance circuit establish the resonance circuit of which a resonance frequency can be easily shifted in response to the situations.

The wireless power transmitter can comprise a control circuit that has an IC chip which is electrically coupled to the switch circuit. Further, the wireless power transmitter can comprise circuit elements for monitoring central power transmission parameters such as voltages applied to the inducting circuit, currents provided to the inductance circuit, phase angles between a transmitted signal and a reflected signal and of course frequencies such as operation frequencies. The wireless power transmitter can have the monitoring circuits and the IC circuit in a control loop to adaptively shift the operation frequencies back to an allowed frequency range.

It is possible that the first and the second transmission coil are concentrically wound. In particular, it is possible that the two coils are concentrically wound in essentially the same plane.

As already stated above, the space for arranging the transmission coils is rare and concentrical windings allow diametric dimensions that do not significantly deviate from the diametric dimensions of conventional power transmission coils.

In particular, it is possible that the windings of the transmission coils are interleaved.

It is possible that the number of turns of the first transmission coil (the main transmission coil) is larger than the number of turns of the second transmission coil (the additional transmission coil).

Then the first transmission coil (the main transmission coil) will usually have the larger inductance.

Different transmission coils having different inductances are preferred if the transmission coils are exclusively coupled to the impedance circuit and exclusively driven in a mode of operation. If modes of operations are utilized with more than one active transmission circuit, then equal inductances (providing simple control algorithms) or inductances where the next larger inductance is doubled in value can be preferred.

It is possible that the number of turns of the second transmission coil is 1, 2, or 3.

It is possible that coupling the second transmission coil to the inductance circuit changes the magnetic coupling between the first transmission coil and the second transmission coil.

It is possible that the wire of the first and/or the second transmission coil is a litz wire. In litz wires a plurality of isolated wire strands individually isolated from one another are combined to reduce losses caused by the skin effect.

It is possible that the wireless power transmitter further comprises a sheet with a ferrite material. This ferrite sheet may be arranged below a coil layer comprising the first transmission coil and the second transmission coil of the inductance circuit.

This ferrite sheet maybe used to form the shape of a magnetic field emitted by the transmitter. To obtain a high transmission efficiency the magnetic field should be directed towards the receiver which may be arranged below or above the transceiver. If the receiver is arranged above the transmitter, then it is preferred that the amount of magnetic field emitted in a direction below the transmitter is reduced to a minimum. The ferrite sheet can, thus, help increasing the transmitter's efficiency by preventing a magnetic field distribution at locations too far away from the receiver.

Further, it is possible that the wireless power transmitter has a dielectric sheet comprising a dielectric material. The dielectric sheet can be arranged between the coil layer and the ferrite sheet if present.

It is further possible that the inductance circuit has a metal sheet comprising a metal. The metal sheet may be arranged below the ferrite sheet.

The metal sheet may comprise aluminum.

Further, it is possible that the wireless power transmitter has an additional dielectric sheet comprising a dielectric material. The additional dielectric sheet may be arranged between the ferrite sheet and the metal sheet.

A ferrite sheet can be arranged in a ferrite layer. A dielectric sheet can be arranged in a dielectric layer. A metal sheet can be arranged in a metal layer.

A wireless power transmission system comprises wireless power transmitter as described above. Further, the transmission system comprises a wireless power receiver having a reception coil. The reception coil can receive power even if the reception coil of the inductance circuit and the transmission coils are not perfectly arranged relative to each other.

Of course, the power receiver can also comprise a rectifier rectifying transmitted electric energy received by the reception coil and providing a DC power that may be utilized to charge a battery.

It is possible that the transmission coils of the inductance circuit of the transmitter and the reception coils of the power receiver are selected from a DD coil and a spiral coil. Then, interoperability is improved as the transmitter and the receiver can work with spiral coils and/or DD coils.

Such power transmitters, receivers and transmission systems can be used to transfer power of power levels to charge mobile communication system or automobiles or of power levels in between. The power levels can, thus, range from 1 W to 10 kW.

Due to the improved interoperability it is not necessary that transmitter and receiver are from the same manufacturer or from the same manufacturing date. Switchable coils can be on the transmitter side and on the receiver side. The resulting increased flexibility makes it possible that an older receiver can be provided with power from a more modern transmitter and vice versa.

The receiver may also comprise a ferrite sheet, a metal sheet and a first and/or a second dielectric sheet. It is possible that the ferrite sheet of the power transmitter has a rectangular shape and a length of 600 mm and a width of 500 mm. The ferrite sheet of the receiver can also have a rectangular shape and a length of 300 mm and a width of 290 mm.

The first transmission coil can have 14 turns. The second transmission coil can have 1 turns. The inductance of the first transmission coil can be in a range between 150 and 156 µH. The inductance of the first transmission coil and the second transmission coil connected to the first transmission coil can be in a range between 180 µH and 190 µH. The above described wireless power transmission system can be operated in an allowed frequency range, e.g., in the SAE frequency range, with a power efficiency of 90 percent at a distance between transmission and reception coils of more than 150 mm.

Further embodiments provide a method for driving a wireless power transmission system, wherein the method comprises—coupling a first transmission coil to the impedance circuit,—transmit a first amount of power,—determine at least one transmission parameter selected from a voltage, a current, a phase angle, a resonance frequency,—coupling the first transmission coil and a second transmission coil coupled to the first transmission coil in series to the impedance circuit,—transmit a second amount of power,—determine at least one transmission parameter selected from a voltage, a current, a phase angle, a resonance frequency,—transmitting an amount of power larger than the first and second amount utilizing a combination of the transmission coils with the better transmission parameter.

The relevant transmission parameter can be transmitted power, the transmission efficiency and the operation frequency.

BRIEF DESCRIPTION OF THE DRAWINGS

The basic operation principles and schematic equivalent circuit diagrams and non-limiting embodiments are shown in the accompanying drawings.

In particular.

DETAILED DESCRIPTION OF ILLUSTRATIVE EMBODIMENTS

Figure 1:
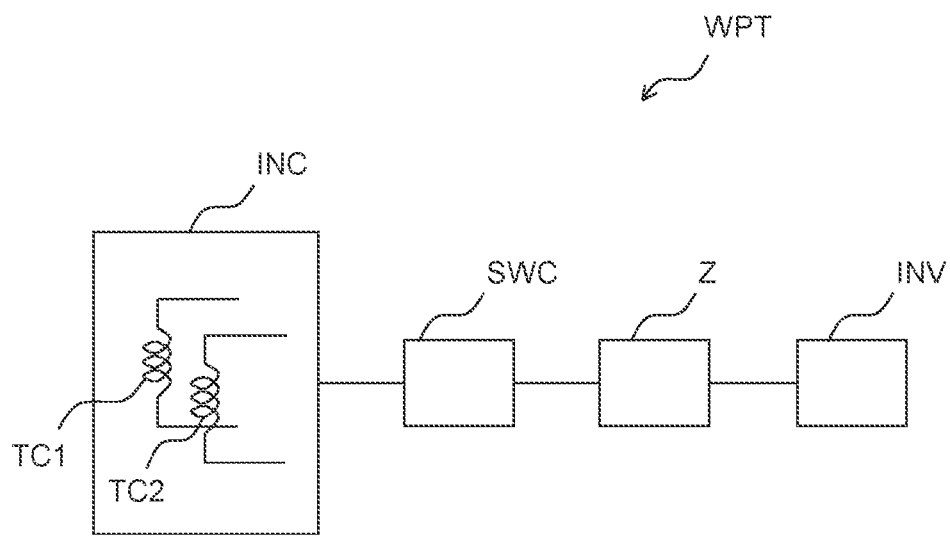
FIG. 1 shows a possible arrangement of the inverter, the impedance circuit, the switch circuit and the inductance circuit.

FIG. 1 shows a basic construction of a wireless power transmitter WPT comprising an inverter INV, an impedance circuit Z, a switch circuit SWC, and an inductance circuit INC. The Inverter INV receives electric power from an external circuit environment and provides the electric power that is to be transmitted to a receiver. The inverter INV provides the electric power at an operation frequency that may be around 85 kHz. The power is transmitted to the impedance circuit Z. The switch circuit SWC electrically connects the inductance circuit INC to the impedance circuit Z. The inductance circuit INC comprises the first transmission coil TC1 and the second transmission coil TC2. The inductance circuit may comprise further transmission coils not shown in FIG. 1. The transmission coils can be wound concentrically. The transmission coils of the inductance circuit INC and circuit elements in the impedance circuit Z establish a resonance circuit to which AC power is provided from the inverter INV. The inverter INV controls the operation frequency of AC power. As the inductance circuit INC has at least two transmission coils and as the switch circuit SWC comprises the switching possibilities to connect the impedance circuit Z to different inductances of the inductance circuit INC the resonance frequency of the resonance circuit can be manipulated. The inverter INV controls the operation frequency in response to a change in the resonance frequency of the resonance circuit, but the inverter INV cannot control the operation frequency within an allowed frequency range when the change is too large. Therefor the switch circuit SWC changes the inductance of the inductance circuit for the sake of decreasing influences from the transmitter's environment. As a result, the operation frequency will ensure compliance with frequency demands.

Figure 2:
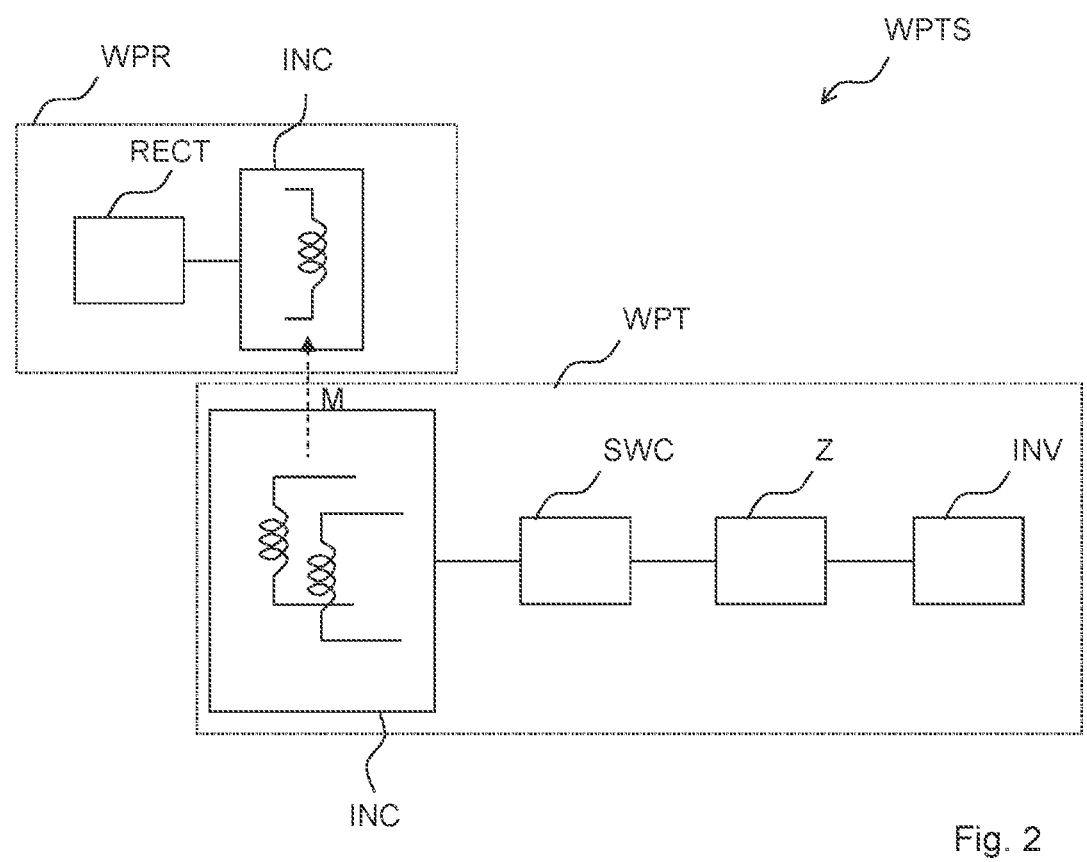
FIG. 2 shows equivalent circuit blocks of basic circuit elements of a wireless power transmission system.

FIG. 2 shows basic circuit elements of a wireless power transmission system WPTS. The system has a wireless power transceiver WPT and a wireless power receiver WPR. The transmission coils of the inductance circuit INC of the transceiver WPT generate a magnetic field M that is received by an inductance circuit INC comprising a reception coil. The received power may be converted to DC power by a rectifier RECT. DC power may be utilized to charge a battery.

Figure 3:
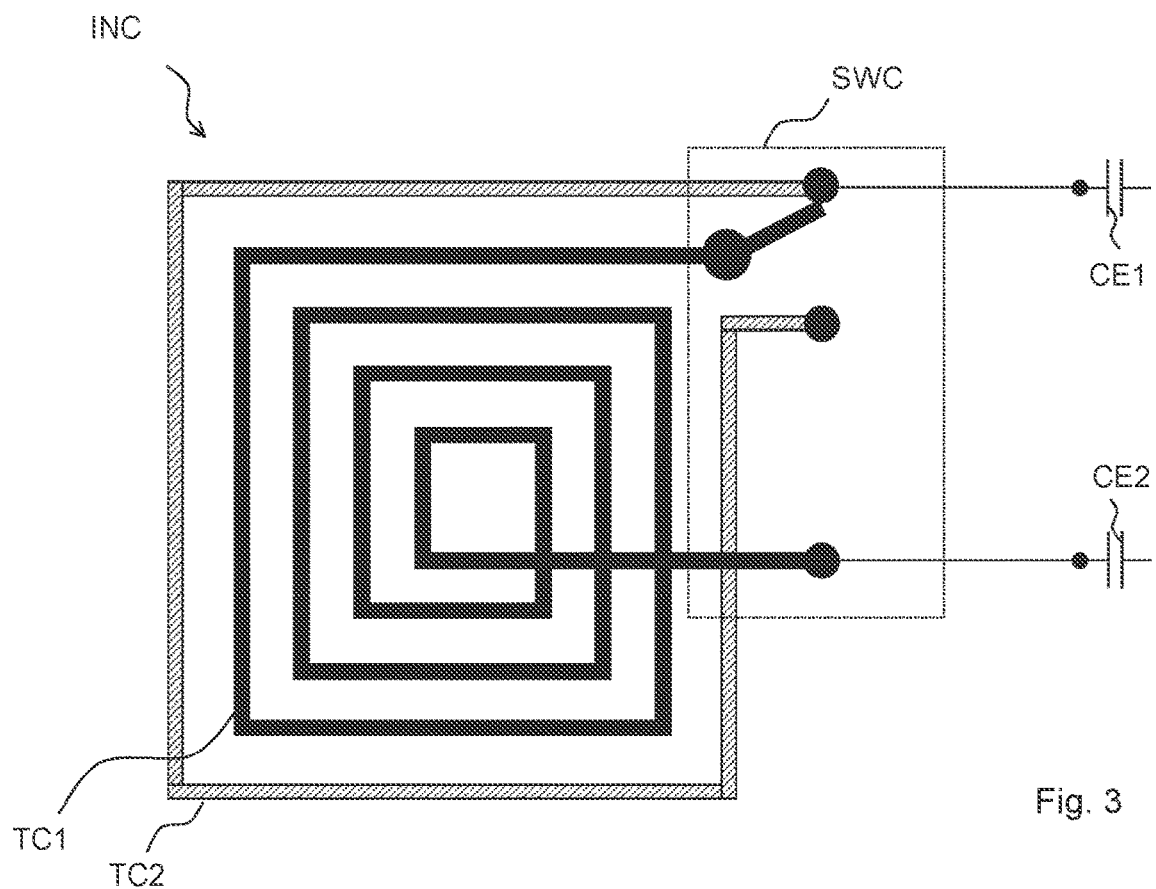
FIG. 3 shows an equivalent circuit diagram of one embodiment with two transmission coils and one switch.

FIG. 3 shows a possible arrangement of the first transmission coil TC1 and of the second transmission coil TC2. Both transmission coils can be concentrically arranged on a carrier. The first transmission coil TC1 can have four turns. The second transmission coil TC2 can have one turn. The switch circuit SWC can comprise a single switch with two switching states. A first inductive element of the impedance circuit Z can be connected to a first connection electrode of the first transmission coil TC1. A second capacitive element of the impedance circuit Z can be connected to a first connection electrode of the second transmission coil TC2. The switch of the switch circuit SWC can be connected to a second connection electrode of the first transmission coil TC1. The switch of the switching circuit SWC can electrically connect the second connection electrode of the first transmission coil TC1 to the first connection electrode of the second transmission coil TC2 (shown in FIG. 3). However, in the other switching state the switch of the switching circuit SWC electrically connects the second connection electrode of the first transmission coil to a second connection electrode of the second transmission coil TC2 (not shown in FIG. 3 but in FIG. 4). In the switching configuration shown in FIG. 3 the second connection electrode of the first transmission coil is electrically connected to the second capacitive element CE2 while the second connection electrode of the second transmission coil TC2 is floating. Then, the second transmission coil TC2 is in an inactive state and mainly only the first transmission coil TC1 is active.

Figure 4:
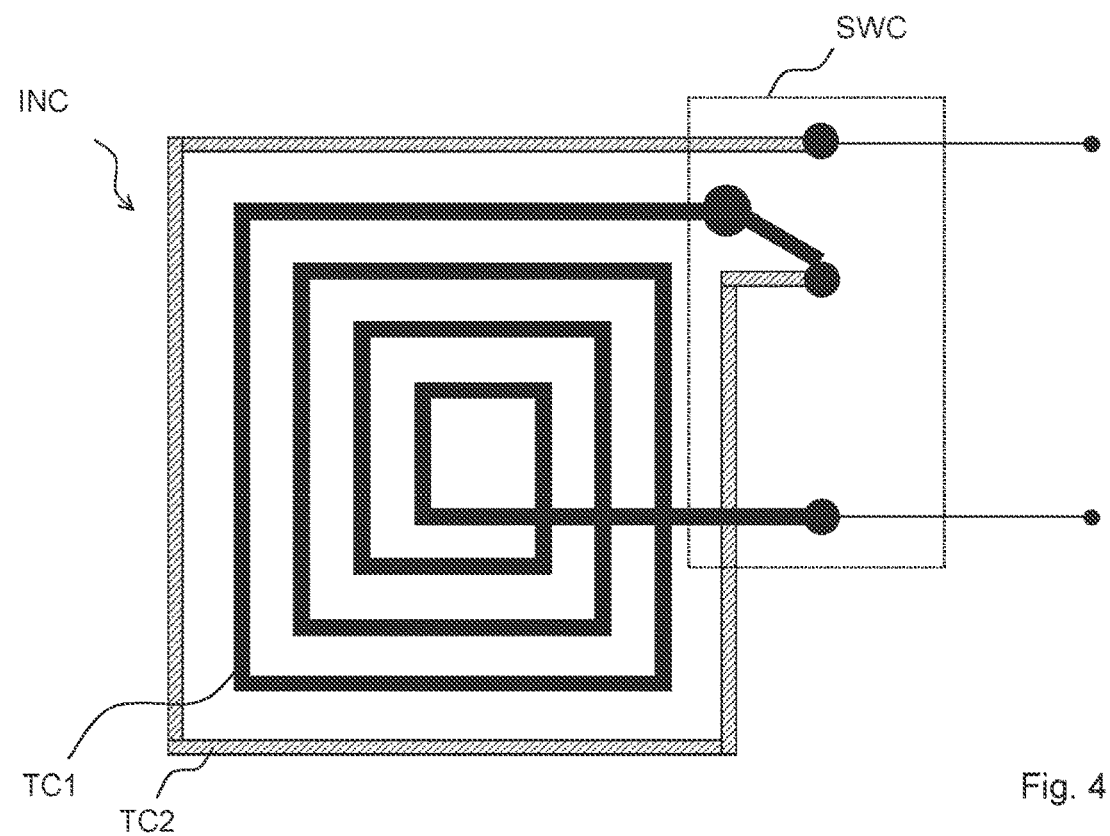
FIG. 4 shows another possible switching state of the switch.

In contrast, in FIG. 4 the second connection electrode of the first transmission coil TC1 is connected to the second connection electrode of the transmission coil TC2 establishing an input of the second transmission coil TC2. Both transmission coils are electrically connected in series and both transmission coils are active.

Thus, via the switch of the switching circuit SWC, the second transmission coil TC2 can be incorporated in or excluded from the inductance circuit INC.

Figure 5:
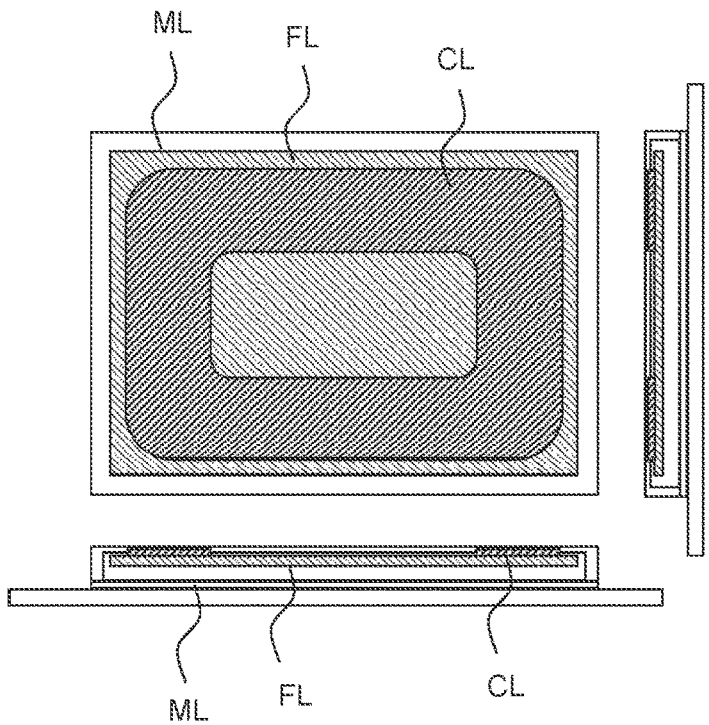
FIG. 5 shows a possible arrangement of layers comprising coils and sheets of the transmitter.

FIG. 5 shows a top view onto the inductance circuit INC comprising a coil layer CL, a ferrite sheet FL, and a metal sheet ML (top portion of FIG. 5) and a cross section through the inductance circuit INC showing the same layers arranged one above another (bottom portion of FIG. 5). The coil layer CL comprises at least two transmission coils which may be concentrically wound. A ferrite sheet FL is arranged between the coil layer CL and the metal sheet ML to shape the density of the magnetic field in such a way that only a small amount of magnetic field is placed in the position where the receiver will not be expected.

Figure 6:
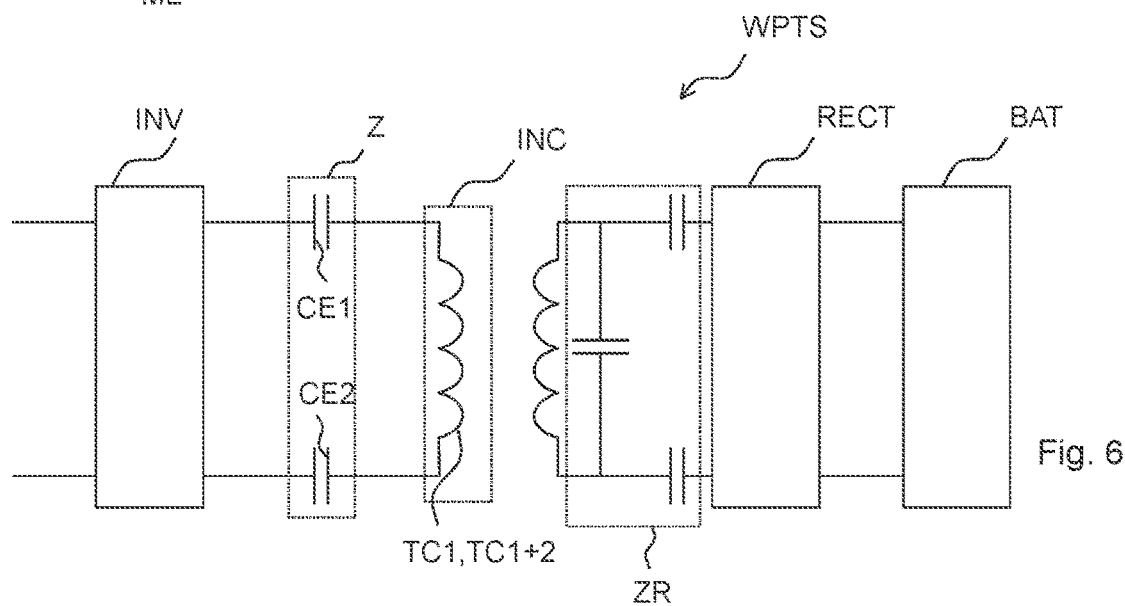
FIG. 6 shows a possible equivalent circuit diagram of a transmission system with two capacitors in the impedance circuit at the transmitter side and three capacitors in an impedance circuit at the receiver side.

FIG. 6 shows a possible equivalent circuit diagram of the transmission system where the impedance circuit Z between the inverter INV and the inductance circuit INC comprises a first capacitance element CE1 and a second capacitance element CE2. Further, on the receiver side, an impedance circuit ZR between the inductance circuit of the receiver side and the rectifier RECT is arranged. The receiver side impedance circuit ZR comprises two capacitive elements establishing the port towards the rectifier RECT. Further, the receiver side impedance circuit ZR comprises an additional capacitance element in a shunt path between the two signal branches. The rectifier RECT is electrically connected to a battery and provides a DC current to the battery BAT.

Figure 7:
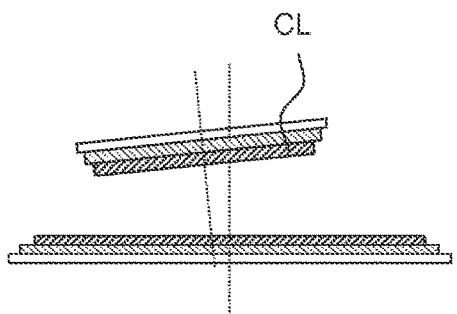
FIG. 7 demonstrates the intrinsic problem of misalignment in wireless power transfer systems.

FIG. 7 shows the basic intrinsic problem of wireless power transfer, i.e., a probable misalignment in orientation of the receiver (top portion) relative to the transmitter (bottom portion). Such a non-perfect alignment would result in a strong frequency shift of the operation frequency. However, by virtue of the switching capabilities and the reality of different operation modes a high power transmission efficiency in an allowed frequency range can be maintained even at quite strong deviations from perfect alignment.

Figure 8:
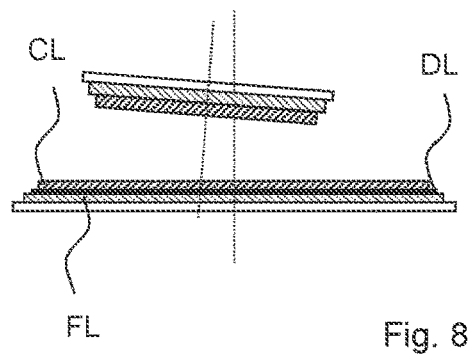
FIG. 8 shows another misaligned system where the transmitter has an additional dielectric sheet.

FIG. 8 shows another misaligned system where the antenna module of the power transmitter has a further dielectric sheet DL arranged between the coil layer CL and the ferrite sheet FL. An additional dielectric sheet (not shown in FIG. 7) can be arranged between the ferrite sheet FL and the metal sheet ML.

Figure 9:
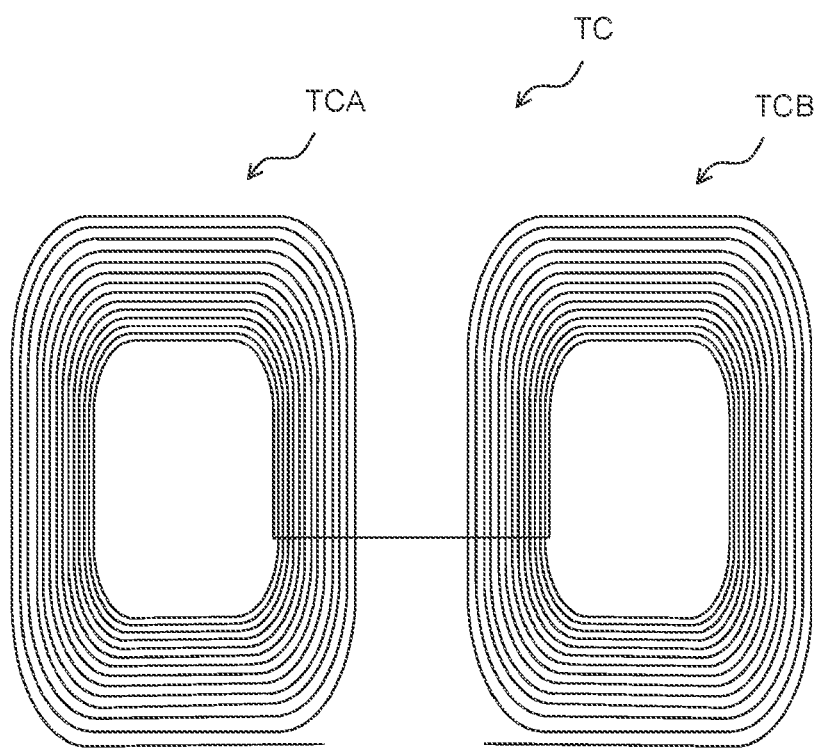
FIG. 9 shows a possible arrangement of the segments of a DD coil.

FIG. 9 shows a possible arrangement of the elements of a DD coil. A DD coil is a possible coil type for a transmission coil TC. A transmission coil TC of the DD coil type has a first coil segment TCA and a second coil segment TCB. The two coil segments TCA, TCB are electrically connected, preferably in series. In contrast, the two transmission coils TC1, TC2 shown in FIGS. 3 and 4 are coils of the spiral type.

Figure 10:
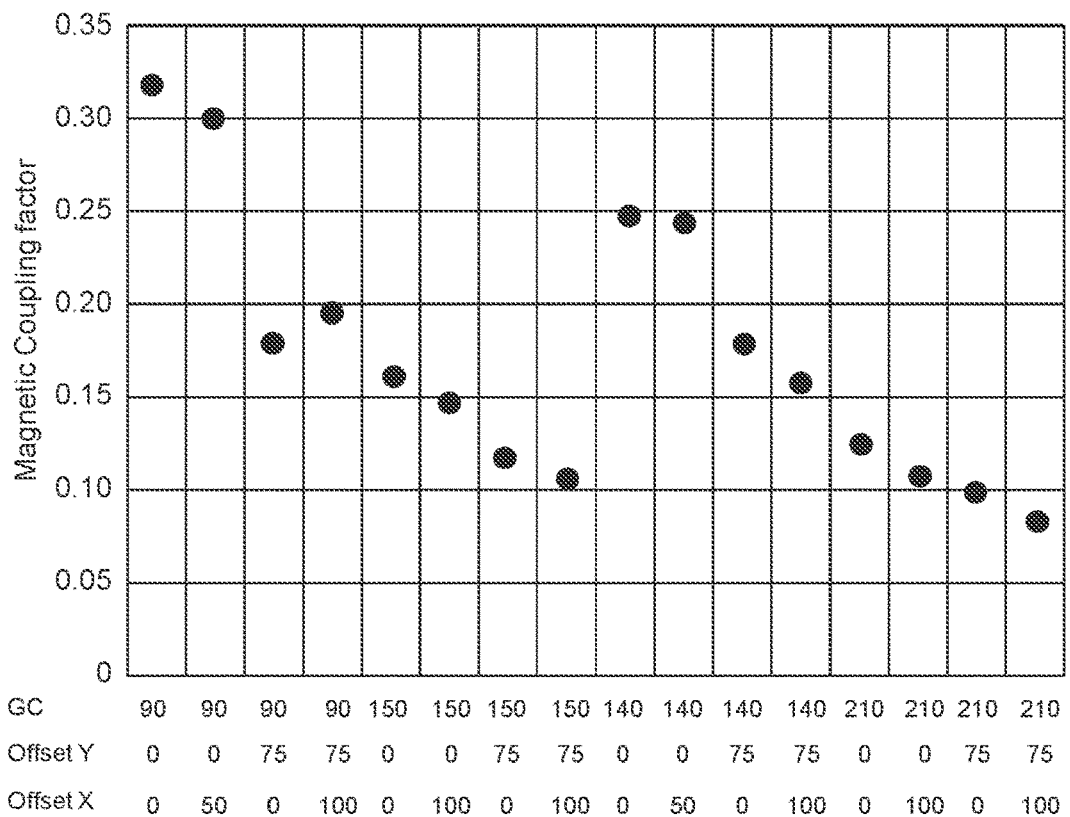
FIG. 10 shows the magnetic coupling factor for different transmitter-receiver arrangements and for different configurations of the switch circuit.

FIG. 10 shows the magnetic coupling factor for the system as shown in FIGS. 3 and 4 for different distances between the sender and the reception coil (GC=ground clearance) and for different offsets in horizontal directions (x,y). The variety of the magnetic coupling factor is relatively large, which is problematic in practical applications.

Figure 11:
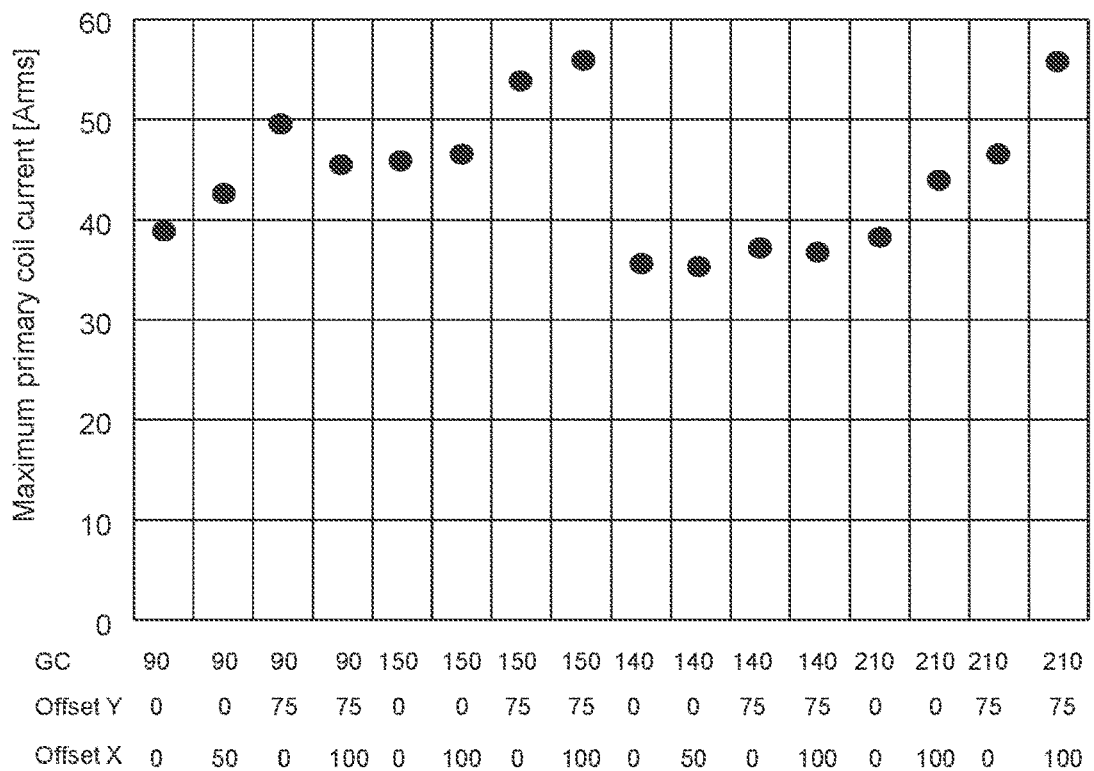
FIG. 11 shows the maximum coil current of the inductance circuit for different transmitter-receiver arrangements and for different switch configurations.

FIG. 11 shows correspondingly the maximum coil current of the transmission coil system in the inductance circuit INC for different vertical (GC) and horizontal (x,y) distances.

Figure 12:
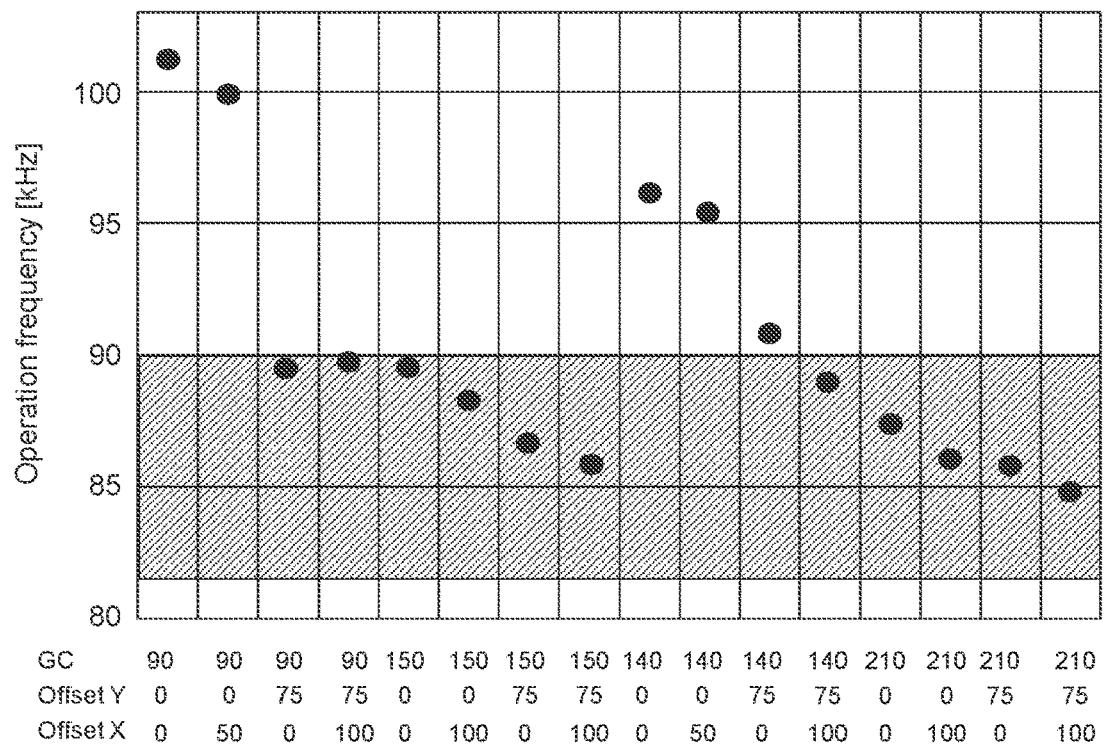
FIG. 12 shows the possible variety of operation frequencies for different transmitter-receiver arrangements and for different switch configurations.

FIG. 12 shows the corresponding operation frequencies for the above-mentioned geometric arrangements. Especially five configurations lead to high operation frequencies which are beyond the upper frequency range of 90 kHz.

Figure 13:
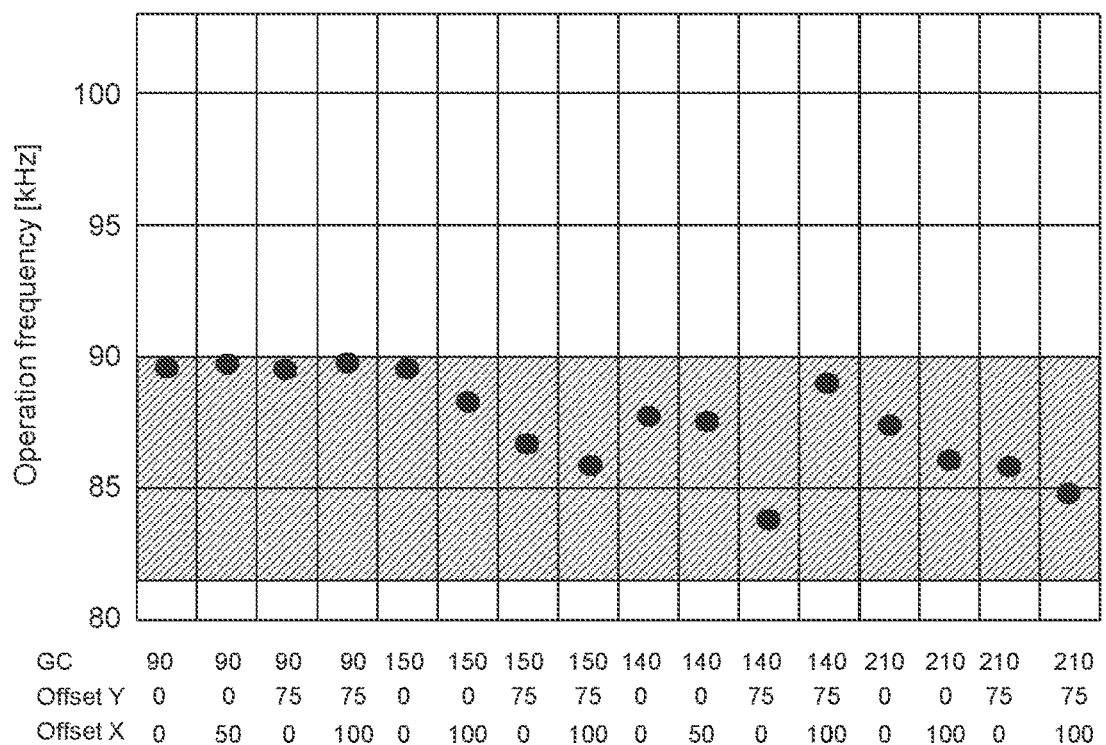
FIG. 13 shows the reduced spectrum for different transmitter-receiver arrangements obtained by an active switch circuit.

FIG. 13 shows the corresponding operation frequencies including the above-mentioned five critical values which are shifted into the allowed frequency range by choosing an appropriate switching configuration. That is, operation frequencies corresponding to the five critical values are lowered by increasing the inductance of the inductance circuit e.g., by connecting the second transmission coil in series to the first transmission coil.

Figure 14:
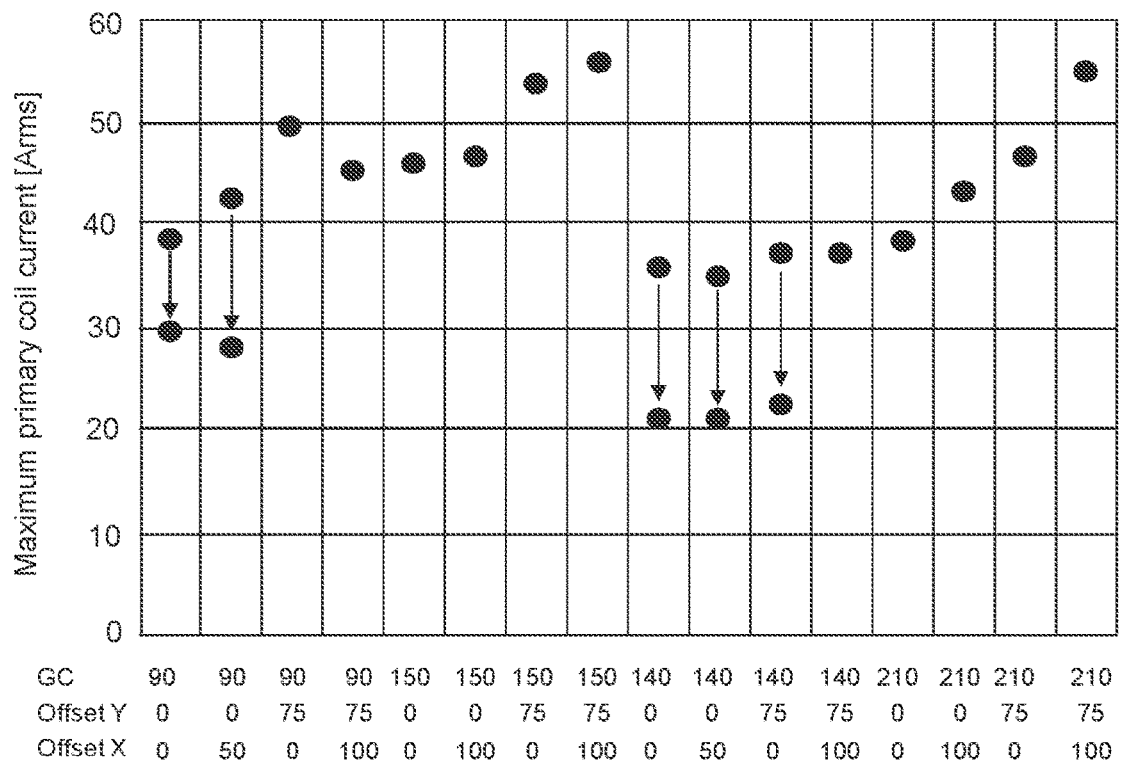
FIG. 14 shows the effect of changing the switching state for different transmitter-receiver arrangements on the maximum coil current.

FIG. 14 shows the direct effect of the switching on the maximum coil current which is drastically reduced for the above-mentioned five (and additional) configurations.

Figure 15:
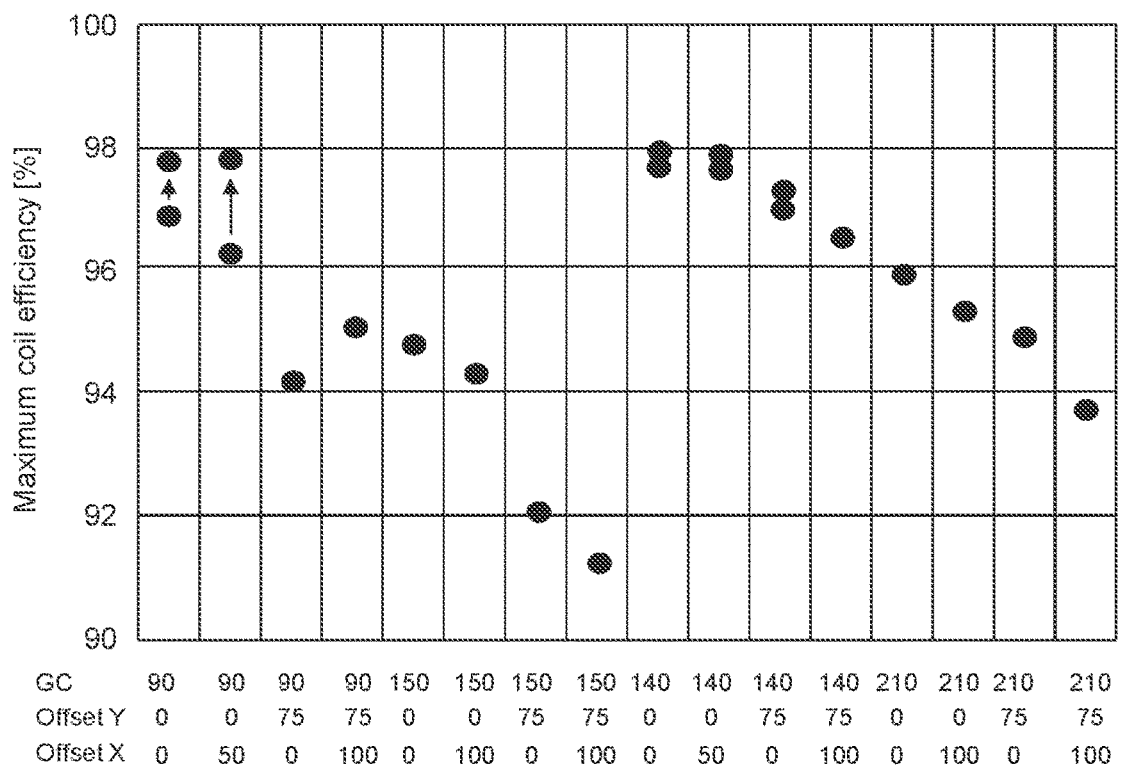
FIG. 15 shows the effect of changing the switching state for different transmitter-receiver arrangements on the coil efficiency.

Correspondingly, FIG. 15 shows the increase in coil efficiency when the above-mentioned five geometric configurations obtain the improved switching state.

The wireless power transmitter, the wireless transmission system and the method for driving such a system are not limited to the devices and circuits described above and shown in the figures. Transmitters and systems comprising further circuit elements, e.g., further inductance or capacitance elements in the inducting circuit, further transmission coils, further switches or additional components for adaptively controlling the operation frequency are also comprised. Correspondingly, methods for driving such systems comprising further steps, e.g., for testing further transmission coil configurations are also comprised.

The invention claimed is:

1. A wireless power transmitter comprising:
an inverter;
an impedance circuit;
an inductance circuit with a first transmission coil and a second transmission coil; and
a switch circuit,
wherein the impedance circuit and the inductance circuit establish a resonance circuit,
wherein the inverter is configured to provide AC power to the resonance circuit, and
wherein the switch circuit is configured to couple the first transmission coil directly to the impedance circuit in a first configuration and to couple the first transmission coil via the second transmission coil to the impedance circuit in a second configuration to change a resonance frequency of the resonance circuit and to keep a frequency of the AC power within a prescribed range.

2. The wireless power transmitter of claim 1, wherein the first and second transmission coils of the inductance circuit are a DD coil or a spiral coil.

3. The wireless power transmitter of claim 1, wherein the switch circuit is configured to couple the first transmission coil parallel to or in series with the second transmission coil.

4. The wireless power transmitter of claim 1, wherein the switch circuit is configured to couple one transmission coil, selected from the first and second transmission coils, to the impedance circuit while the respective other transmission coil is separated from the impedance circuit.

5. The wireless power transmitter of claim 1, wherein the switch circuit comprises a first switch.

6. The wireless power transmitter of claim 1, wherein the impedance circuit comprises a first capacitive element and a second capacitive element.

7. The wireless power transmitter of claim 1,
wherein the switch circuit comprises a first switch,
wherein the impedance circuit comprises a first capacitive element and a second capacitive element,
wherein the first transmission coil is connected in series between the first capacitive element and the second capacitive element, and
wherein the switch circuit can electrically connect the second transmission coil in series between the first transmission coil and the second capacitive element.

8. The wireless power transmitter of claim 1,
wherein the impedance circuit is electrically connected between the switch circuit and the inverter, and
wherein the switch circuit is electrically connected between the inductance circuit and the impedance circuit.

9. The wireless power transmitter of claim 1, wherein the first and second transmission coils are concentrically wound in essentially the same plane.

10. The wireless power transmitter of claim 1, wherein a number of turns of the first transmission coil is larger than a number of turns of the second transmission coil.

11. The wireless power transmitter of claim 1, wherein a number of turns of the second transmission coil is 1, 21, or 22.

12. The wireless power transmitter of claim 1, wherein coupling the second transmission coil to the inductance circuit changes a magnetic coupling between the first transmission coil and the second transmission coil.

13. The wireless power transmitter of claim 1, wherein a wire of the first or second transmission coil is a litz wire.

14. The wireless power transmitter of claim 1, further comprising a ferrite sheet comprising a ferrite material, wherein the ferrite sheet is arranged below a coil layer comprising the first transmission coil and the second transmission coil.

15. The wireless power transmitter of claim 14, further comprising a dielectric sheet comprising a dielectric material, wherein the dielectric sheet is arranged between the coil layer and the ferrite sheet.

16. The wireless power transmitter of claim 15, further comprising a metal sheet comprising a metal, wherein the metal sheet is arranged below the ferrite sheet.

17. The wireless power transmitter of claim 16, further comprising an additional dielectric sheet comprising a dielectric material, wherein the additional dielectric sheet is arranged between the ferrite sheet and the metal sheet.

18. A wireless power transmission system comprising:
    the wireless power transmitter of claim 1; and
    a power receiver having a reception coil configured to receive power, even if the reception coil and the inductance circuit are not perfectly arranged relative to each other.

19. A method for driving the wireless power transmitter according to claim 1, the method comprising:
    coupling the first transmission coil to the impedance circuit;
    transmitting a first amount of power;
    determining at least one first transmission parameter selected from a voltage, a current, a phase angle, or the resonance frequency;
    coupling the first transmission coil and the second transmission coil coupled to the first transmission coil in series to the impedance circuit;
    transmitting a second amount of power;
    determining at least one second transmission parameter selected from the voltage, the current, the phase angle, or the resonance frequency; and
    transmitting an amount of power larger than the first and second amount utilizing a combination of the first and second transmission coils at the frequency within the prescribed range.

* * * * *